(12) United States Patent
Jensen et al.

(10) Patent No.: US 7,807,226 B2
(45) Date of Patent: Oct. 5, 2010

(54) SYSTEM, DEVICE, AND METHOD FOR PRODUCING THIN PLASTIC LENSES

(75) Inventors: Paul C. Jensen, Westford, MA (US); Anthony L. Gelardi, Cape Porpoise, ME (US); James P. Elliott, Eliot, ME (US)

(73) Assignee: Nypro Inc., Clinton, MA (US)

( * ) Notice: Subject to any disclaimer, the term of this patent is extended or adjusted under 35 U.S.C. 154(b) by 1095 days.

(21) Appl. No.: 11/262,315

(22) Filed: Oct. 28, 2005

(65) Prior Publication Data

US 2006/0163760 A1    Jul. 27, 2006

Related U.S. Application Data

(60) Provisional application No. 60/622,834, filed on Oct. 28, 2004.

(51) Int. Cl.
*B05D 5/00* (2006.01)
(52) U.S. Cl. .................. 427/256; 425/348 R; 425/347; 425/411; 425/412; 425/447; 425/449; 425/808; 264/1.1; 264/1.36; 264/2.2; 264/2.3; 264/2.5; 264/297.2; 264/297.3; 264/297.6; 264/297.8
(58) Field of Classification Search .................. 427/256; 264/1.1, 2.2, 2.5, 297.3, 297.6; 425/411, 425/412, 449, 808
See application file for complete search history.

(56) References Cited

U.S. PATENT DOCUMENTS

| | | | |
|---|---|---|---|
| 4,008,031 A | 2/1977 | Weber | 425/242 |
| 4,091,057 A | 5/1978 | Weber | 264/1 |
| 4,184,835 A | 1/1980 | Talbot | 425/577 |
| 4,540,534 A | 9/1985 | Grendol | 264/2.2 |
| 4,828,769 A | 5/1989 | Maus et al. | 264/1.3 |
| 4,900,242 A | 2/1990 | Maus et al. | 425/149 |
| 5,008,052 A | 4/1991 | Harada | 264/40.5 |
| 5,093,059 A | 3/1992 | Nathoo et al. | 264/121 |

(Continued)

FOREIGN PATENT DOCUMENTS

CN    1638939    9/2004

(Continued)

OTHER PUBLICATIONS

F. Zattoni, Communication pursuant to Article 94(3) EPC in a related application EP 05 819 608.0-1253, dated Jul. 31, 2008, 2 pages.

(Continued)

*Primary Examiner*—Michael Kornakov
*Assistant Examiner*—Xiao Zhao
(74) *Attorney, Agent, or Firm*—Sunstein Kann Murphy & Timbers LLP (57) ABSTRACT

Light transmission devices, such as lenses and windows for portable electronic devices, are produced using an injection/compression molding technique in which a light transmission device mold includes an integral runner in substantially the same plane and with substantially the same wall thickness as the light transmission device to be produced. The finished light transmission devices are mechanically separated from the molded product. Molding equipment and processes traditionally used to produce information discs can be leveraged to produce light transmission devices. Various processes can be performed to add metallization, coatings, and printing to the light transmission devices.

21 Claims, 9 Drawing Sheets

U.S. PATENT DOCUMENTS

| | | | |
|---|---|---|---|
| 5,189,531 A | 2/1993 | Palmer et al. | 359/3 |
| 5,405,259 A | 4/1995 | Morikita | 425/556 |
| 5,415,817 A | 5/1995 | Shiao et al. | 264/2.2 |
| 5,539,971 A | 7/1996 | Kelly | 29/418 |
| 5,690,974 A | 11/1997 | Miyairi | 425/577 |
| 5,694,387 A | 12/1997 | Gotoh et al. | 369/53.12 |
| 5,720,994 A | 2/1998 | Asai et al. | 425/556 |
| 5,729,533 A | 3/1998 | Marquardt | 369/273 |
| 5,750,156 A * | 5/1998 | Maus et al. | 425/139 |
| 5,855,824 A | 1/1999 | Saito et al. | 264/2.2 |
| 5,922,266 A | 7/1999 | Grove | 264/297.2 |
| 5,938,989 A | 8/1999 | Hambright | 264/2.5 |
| 5,948,327 A | 9/1999 | Saito et al. | 264/2.2 |
| 5,968,439 A | 10/1999 | Grove | 264/297.2 |
| 5,972,252 A | 10/1999 | Saito et al. | 264/2.2 |
| 6,024,902 A | 2/2000 | Maus et al. | 264/40.5 |
| 6,042,754 A * | 3/2000 | Yang et al. | 264/1.1 |
| 6,099,287 A | 8/2000 | Higashida et al. | 425/190 |
| 6,124,011 A | 9/2000 | Kern | 428/64.1 |
| 6,224,810 B1 | 5/2001 | Tsutsumi | 264/272.15 |
| 6,238,197 B1 | 5/2001 | Van Hout et al. | 425/168 |
| 6,284,162 B1 | 9/2001 | Kingsbury et al. | 264/2.2 |
| 6,290,882 B1 | 9/2001 | Maus et al. | 264/2.2 |
| 6,440,335 B1 | 8/2002 | Kingsbury et al. | 264/2.2 |
| 6,490,239 B1 | 12/2002 | Nagasaka | 369/275.4 |
| 6,514,437 B1 | 2/2003 | Higashida et al. | 264/1.33 |
| 6,517,751 B1 | 2/2003 | Hambright | 264/25 |
| 6,616,868 B1 | 9/2003 | Gotoh et al. | 264/2.2 |
| 6,638,692 B1 | 10/2003 | Banal et al. | 430/320 |
| 6,705,725 B2 | 3/2004 | Gotoh et al. | 351/159 |
| 6,730,378 B2 | 5/2004 | Matsuoka et al. | 428/35.7 |
| 6,767,482 B2 | 7/2004 | Nishimoto | 264/2.2 |
| 6,797,214 B1 | 9/2004 | Ruuttu et al. | 264/161 |
| 6,875,380 B2 | 4/2005 | Kishi et al. | 264/2.6 |
| 2001/0051842 A1 | 12/2001 | Cameron | 700/197 |
| 2002/0001108 A1* | 1/2002 | Yeo | 359/8 |
| 2002/0034154 A1 | 3/2002 | Iwata et al. | 369/282 |
| 2002/0122252 A1* | 9/2002 | Hebrink et al. | 359/498 |
| 2003/0080448 A1 | 5/2003 | Nishimoto et al. | 264/1.32 |
| 2003/0164564 A1 | 9/2003 | Klotz | 264/2.2 |
| 2004/0012122 A1 | 1/2004 | Nagaoka et al. | 264/328.7 |
| 2004/0061247 A1 | 4/2004 | Koyama et al. | 264/1.33 |
| 2004/0134234 A1* | 7/2004 | Katzman et al. | 65/61 |
| 2004/0253337 A1 | 12/2004 | Hashimoto et al. | 425/354 |
| 2005/0124191 A1 | 6/2005 | Stanton et al. | 439/135 |
| 2005/0163940 A1 | 7/2005 | Liang et al. | 428/1.1 |

FOREIGN PATENT DOCUMENTS

| | | |
|---|---|---|
| DE | 196 03 733 | 11/1996 |
| EP | 0 284 387 | 9/1988 |
| EP | 0 723 847 | 3/1999 |
| EP | 0 967 061 | 12/1999 |
| EP | 1 609 820 | 12/2005 |
| FI | 20020239 | 8/2003 |
| WO | WO 99/37471 | 7/1999 |
| WO | WO 01/38064 | 5/2001 |
| WO | WO 03/066307 | 8/2003 |
| WO | WO 2005/002305 | 1/2005 |
| WO | WO 2005/050298 | 6/2005 |

OTHER PUBLICATIONS

Roy Marsh, Response to Communication pursuant to Article 94(3) EPC in a related application EP 05 819 608.0-1253, dated Feb. 10, 2009, 20 pages.
Patent Abstracts of Japan, vol. 2000, No. 5, Sep. 14, 2000 & JP 2000 037787 A, Feb. 8, 2000, one page.
Patent Abstracts of Japan, vol. 13, No. 420, Sep. 19, 1989 & JP 01 159226, Jun. 22, 1989, one page.
International Search Report and Written Opinion of the International Searching Authority, PCT/US2005/039190, Jun. 12, 2006, 14 pages.
ArrowDisc: "Custom Shape, Business Card, and Mini CDs—CD-Rom Replication, Mastering" information page, www.arrowdisc.com, printed Apr. 14, 2006, 2 pages.
ArrowDisc: "Why Use ArrowDisc for Shaped CD Manufacturing," www.arrowdisc.com, printed Apr. 14, 2006, 2 pages.
"Custom Shaped CDs & Business Card CDs," Spin Digital Media Corp., www.spindigitalmedia.com, printed Apr. 14, 2006, 1 page.
"A New Dimensions in Brand Marketing," Shape Media, LLC, www.shaped.com, printed Apr. 14, 3006, 2 pages.
Custom Cutting Technologies, Inc. home page, www.customcut.net, printed Apr. 14, 2006, 1 page.
F. Zattoni, Communication pursuant to Article 94(3) EPC in related application EP 05 819 608.0-1253, dated Oct. 28, 2009, 3 pages.
Roy Marsh, Response to European office action (draft version approved for filing), 9 pages.
Xu Lingjiang, Letter reporting office action for related Chinese application No. 200580045094.3, dated Jul. 2, 2009, 2 pages.
Jeff Klayman, Letter to Chinese associate with instructions for response to Chinese office action, dated Jan. 7, 2010, 8 pages.

* cited by examiner

SYSTEM, DEVICE, AND METHOD FOR PRODUCING THIN PLASTIC LENSES

PRIORITY

This patent application claims priority from U.S. Provisional Patent Application No. 60/622,834 entitled SYSTEM, DEVICE, AND METHOD FOR PRODUCING THIN PLASTIC LENSES, which was filed on Oct. 28, 2004 and is hereby incorporated by reference in its entirety.

FIELD OF THE INVENTION

The present invention relates generally to the manufacture of light transmission devices, such as thin plastic lenses or windows for electronic devices, medical diagnostic equipment, consumer industrial appliances, automotive components, and other applications.

BACKGROUND OF THE INVENTION

In today's electronic age, many electronic devices (e.g., wireless phones, personal digital assistants, audio players, etc.), medical diagnostic equipment, consumer industrial appliances, automotive components, and other devices include display screens that are protected by thin plastic windows or lenses. Such light transmission devices are typically produced using injection molding or extruding processes. In most applications, it is desirable for such light transmission devices to be inexpensive, impact and scratch resistant, optically clear, and distortion-free.

An important issue in producing such light transmission devices is the management of stress in the fabrication of the device. Stress is basically force per unit area. The resulting phenomenon in the material is actually induced stress, which is the residual effect of the molding process. The more elastic the part or material, the less permanent the stress, and this relationship is the modulus of elasticity.

Stress may be induced during the primary phase of fabrication (e.g., through the molding process, including the injection mold) and also in ancillary and/or downstream processes (e.g., through introduction of chemicals and/or mechanical treatment of the device). Some stresses may be relieved after fabrication, for example, through annealing. In an injection molding process, the results of stress are mostly permanent, unless a secondary stress relief process is introduced.

Stress, particularly undefined and uncontrolled stress, is normally undesirable in any functional material. An exception to this as an example may be a "scribed" part (i.e., a part with an intentionally introduced mechanical stress that allows the part to be broken at a certain point as a function of use). Thus, one consideration in the manufacture of light transmission devices may be the mitigation of "unintentional" stress.

Polymer flow is non-Newtonian. Newtonian flow behavior means that the viscosity does not change with a change in shear rate (flow rate). Since plastic is a polymer, there is a relationship between shear rate and viscosity. In the flow dynamic, increased alignment decreases viscosity. Decreased and consistent viscosity is an indication that shear rate increases. Shear stress is the stress caused by internal layers of molecules flowing at different speeds. Nominal flow rate is the flow rate obtainable with relatively low pressure drops. Molds with varying flow rates caused by the runner geometry introduce pressure variations and/or drops that change the varying internal velocity and speed, thereby inducing stress.

One problem that can be caused by uneven molecular orientation or internal stresses in the light transmission device is birefringence. Birefringence occurs when the lens material has multiple indices of refraction. This causes beams of light to travel at different velocities, which can produce a rainbow effect when the lens is viewed at varying angles.

SUMMARY OF THE INVENTION

In accordance with one aspect of the invention, light transmission devices, such as clear plastic lenses/windows for use in electronic devices, medical diagnostic equipment, consumer industrial appliances, automotive components, and other devices, are produced through an injection-compression molding or coining process in which the conventional runner system is eliminated.

In accordance with another aspect of the invention, molding equipment and processes for the manufacture of compact discs and the like are leveraged to produce light transmission devices. The compact disc mold may be modified or otherwise configured with the outline of a product geometry including a center bar (with center sprue/hole) with one or more attached lenses. The molded product is formed using an injection-compression molding process. A hologram, label, image, graphic, digital code, RFID tag, or other decoration or feature may be in-molded in the molded product. A first de-gating process (i.e., removal of the residual sprue) is preferably performed with the molded product still in the mold, for example, using a hole punch that operates through the core block of the mold. The lenses are separated from the molded product, for example, using a machining process.

In accordance with another aspect of the invention there is provided a method for producing light transmission devices. The method involves forming the molded product using an injection-compression molding or coining technique, removing a residual sprue from the molded product, and separating each light transmission device from the molded product. The light transmission device mold may include an outline of a product geometry including a center bar (with center sprue/hole) with one or more attached light transmission devices. A hologram, label, image, graphic, digital code, RFID tag, or other decoration or feature may be in-molded in the molded product, for example, by including an appropriate stamp or other component within the mold. The method may also involve various finishing processes, such as metallization, coating, and printing.

In accordance with another aspect of the invention there is provided a light transmission device that is formed by the process of forming a molded product using an injection-compression molding or coining technique, removing a residual sprue from the molded product, and separating each light transmission device from the molded product. The light transmission device may include one or more in-molded features, such as a hologram, label, image, graphic, digital code, RFID tag, or other decoration or feature. The light transmission device may also include one or more additional features, such as metallization, coating, and printing features.

In accordance with another aspect of the invention there is provided apparatus for producing light transmission devices. The apparatus includes a mold having a cavity block and a core block. The cavity block may include an outline of a product geometry including a center bar (with center sprue/hole) with one or more attached light transmission devices. The cavity block and the core block are placed in a molding machine. The molded product is formed using an injection-compression molding technique. A hologram, label, image, graphic, digital code, RFID tag, or other decoration or feature may be in-molded in the molded product, for example, by including an appropriate stamp or other component within the mold. A residual sprue is removed from the lens assembly, preferably while the molded product is still within the mold. Each light transmission device is separated from the molded product.

In one particular embodiment of the invention there is provided a method for producing a light transmission device involving introducing a light transmission device mold into a molding machine, the light transmission device mold having an integral runner in substantially the same plane and with substantially the same wall thickness as the light transmission device; injecting molten plastic into the mold and compressing the mold to form a molded product through an injection/compression molding process; and mechanically separating the light transmission device from the molded product.

In related embodiments, the mold may include an outline of the light transmission device such that the molded product includes a substantially shaped light transmission device or may be substantially devoid of light transmission device features such that the molded product is a blank from which the light transmission device is cut. A residual sprue may be removed from the molded product within the mold, for example, by punching out the residual sprue. A mechanical reference may be produced during this process.

In other related embodiments, prior to injecting the molten plastic into the mold, a stamp may be introduced into the mold. The stamp includes an arrangement of pit art features for producing at least one optical reference in the molded product. The arrangement may include a plurality of pit art semi-circles and a pit art caret. The stamp may also include an arrangement of product-specific pit art features for producing pit art in the light transmission device, such as a hologram. The stamp may be formed using a substantially conventional laser beam recorder used to produce stamps for information discs. Generally speaking, a hologram, a label, an image, a graphic, a digital code, an RFID tag, or other decoration or feature may be in-molded in the molded product.

In other related embodiments, metal may be deposited onto the molded product. In an exemplary embodiment, this is accomplished by introducing a selective masking within an application metal deposition machine, aligning the molded product in the metal deposition machine using the at least one optical reference in the molded product, aligning the selective masking with the molded product, the selective masking exposing areas of the molded product on which metal is to be deposited, and depositing metal on the exposed areas of the molded product. The molded product may be aligned in the metal deposition machine using at least one of a mechanical reference and an optical reference formed in the molded product.

In other related embodiments, various coatings may be applied on the molded product. Coatings may include protective coatings, anti-fingerprint coatings, anti-glare coatings, and other types of coatings. Coatings may be applied by spin coating. Typically, coatings are formed one side at a time.

In other related embodiments, after coatings are applied, various features may be printed on the molded product, for example, using a stamp with UV ink.

In another particular embodiment of the invention there is provided a system for producing a light transmission device including a light transmission device mold having an integral runner in substantially the same plane and with substantially the same wall thickness as the light transmission device; a molding machine for receiving the light transmission device mold, injecting molten plastic into the mold, and compressing the mold to form a molded product through an injection/compression molding process; and a separating machine for mechanically separating the light transmission device from the molded product.

In related embodiments, the molding machine may be a substantially conventional injection/compression molding machine used to produce information discs. The separating machine may be a CNC machine, laser, punch die, or other machine programmed to separate the light transmission device from the molded product.

In other related embodiments, the system includes equipment for forming a stamp having an arrangement of pit art features including various optical alignment features. This equipment may include a laser beam recorder and a punch machine for punching a keyhole in the stamp using at least one of the optical alignment features as a reference. The stamp is introduced into the mold for forming optical references and optional product-specific pit art features in the molded product. The stamp may be formed using a substantially conventional laser beam recorder used to produce stamps for information discs.

In other related embodiments, the system may include a metal deposition machine for depositing metal onto the molded product. A selective masking may be used for exposing areas of the molded product on which metal is to be deposited. The system may additionally or alternatively include a coating machine for depositing various coatings on the molded product. The system may optionally include a printing machine for printing at least one feature on the molded product.

In another particular embodiment there is provided a method for forming a stamp for use in injection/compression molding of light transmission devices involving providing a stamp substrate, forming generic pit art with alignment features in the stamp substrate, the alignment features including a pit art ring and a pit art box, centering the stamp substrate in a punch machine using the pit art ring as an optical reference, and punching a keyhole in the stamp substrate such that a center line of the keyhole is aligned with a center line of the pit art box.

In another particular embodiment there is provided a device for use in injection/compression molding of light transmission devices including a substrate and a first arrangement of pit art features formed in the substrate for producing at least one optical reference in an injection/compression molded product.

DETAILED DESCRIPTION OF A PREFERRED EMBODIMENT

In embodiments of the present invention, light transmission devices (e.g., lenses/windows) for use in electronic devices, medical diagnostic equipment, consumer industrial appliances, automotive components, and other devices, are produced through an injection-compression molding or coining process in which the conventional runner system is eliminated. Instead, the runner becomes an integral part of the molded product. The integral runner is typically in the same plane, and has substantially the same wall thickness, as the molded light transmission devices. Such an integral runner application virtually eliminates the pressure drop or differential created by conventional runner systems, and therefore allows for an oriented, substantially laminar flow that significantly reduces stress and adds strength (flexural modulus) to a low molecular weight material or high melt index (high melt index is desirable for flow characteristics, so preserving its physical integrity is advantageous; low molecular weight materials are typically brittle, although this characteristic might be tempered by the low stress and molecular orientation).

During molding, a stamp may be used to produce various "pit art" features on the molded product. The pit art features can form a hologram or other feature on the light transmission devices, and can also form various optical references for orienting the molded product during various finishing processes such as metal deposition, coating, printing, and mechanical separation of the light transmission devices from the molded product.

A sequenced parting line is typically employed in order to reduce cycle time and improve optical characteristics through reduced stress. The primary runner is typically de-gated in the mold (typically while the resin is near the vicat softening point), thereby eliminating the first de-gating operation outside of the mold. The in-mold de-gating process may produce an intrinsic reference point (e.g., a notch) to facilitate subsequent processing of the molded part. The light transmission devices are typically separated from the runner during a second de-gating process (e.g., using a hot knife, ultrasonic application, laser, or other mechanical process). Optical and/or mechanical reference points can be used for positive location of the molded product during de-gating.

In accordance with various embodiments of the present invention, molding processes and equipment traditionally used for producing compact discs, data discs, digital versatile discs, and the like (referred to hereinafter as "information discs") are leveraged for producing light transmission devices. As known in the art, information discs are often produced using an injection-compression molding or coining process in which a molten plastic is injected into a mold that includes a cavity block, a core block, and a stamp that includes a predetermined pattern of bumps (which represent the information content of the disc). The core block is then compressed against the cavity block under high pressure so that the molten plastic completely fills the mold chamber, thereby producing the molded disc including the predetermined pattern of bumps from the stamp. Minute ventilation holes machined into one or both of the mold blocks (typically along the parting lines of the mold blocks) allow air and other gases to escape from the cavity during injection and compression so that the molten plastic can fully fill the cavity and backpressure on the molten plastic is reduced. While still in the mold, the residual sprue (which is typically located in the center of the disc) is removed through a so-called "de-gating" process, typically by punching out the sprue to form the hole in the center of the disc. After the disc is removed from the mold, a metal layer is deposited onto the stamped side of the disc and a polymer layer is deposited over the metal layer for protection. A label or other decoration can then be applied to the disc.

In a first exemplary embodiment of the present invention, the cavity block is configured with the outline of a light transmission device geometry including a center bar or land area (with center sprue/hole) with one or more attached light transmission devices, as described in more detail below. Injection-compression molding or coining is used to produce the molded product. A hologram, label, image, graphic, digital code, RFID tag, or other decoration or feature may be in-molded in the molded product, for example, by including an appropriate stamp or other component within the mold. A first de-gating process (i.e., removal of the residual sprue) is preferably done within the molding equipment, for example, using a punch that operates through the center of the core block to punch out the sprue and form a center hole. The center hole can be notched or otherwise formed with an intrinsic reference point so as to facilitate certain post-processing operations, as discussed below. After the molded product is ejected from the mold, further processing can be done on the molded product, such as metallization and coatings. The center hole can be used to hold or position the molded product (e.g., on a spindle) to facilitate such further processing. The light transmission devices are separated from the molded product, and, more specifically, from the center bar of the molded product, typically by a machining process. The separated light transmission devices can be processed even further.

Figure 1:
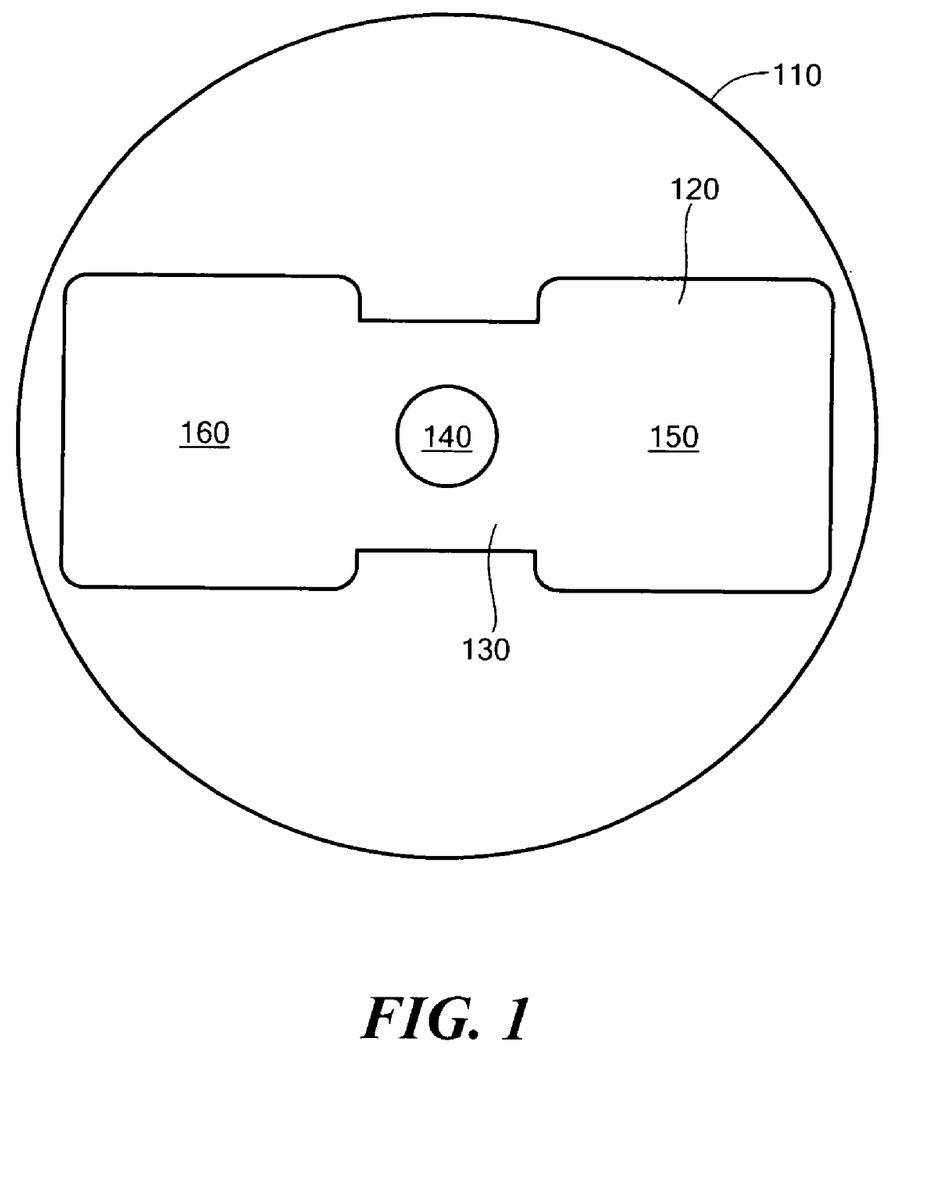
FIG. 1 shows the outline of an exemplary lens assembly, relative to a typical round compact disc, in accordance with an embodiment of the present invention.

FIG. 1 shows the outline of an exemplary product geometry 120, relative to a typical round compact disc 100, in accordance with an embodiment of the present invention. The product geometry 120 includes a center bar 130 having a center sprue/hole 140. Two substantially rectangular light transmission devices 150 and 160 are integrally attached to the center bar 130.

Figure 2:
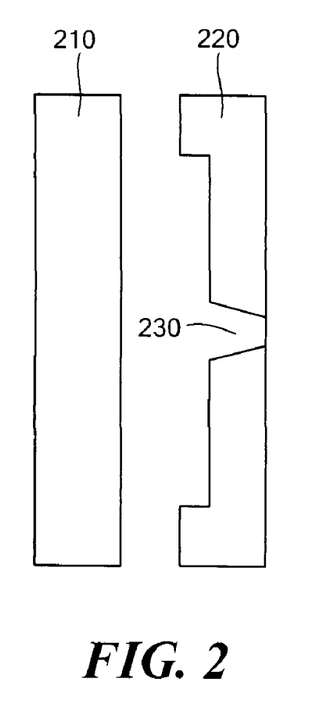
FIG. 2 shows a cross-sectional view of a mold in accordance with an embodiment of the present invention.

FIG. 2 shows a cross-sectional view of a mold in accordance with an embodiment of the present invention. The mold includes a core block 210 and a cavity block 220. The cavity block 220 is typically mounted to a stationary plate within the compact disc molding machine, while the core block 210 is typically mounted to a movable plate within the compact disc molding machine. The cavity block 220 includes the cavity for the product geometry, such as the product geometry 120 shown in FIG. 1. For flat light transmission devices, the core block 210 is typically flat and polished. The cavity block 220 includes a sprue 230 through which the molten plastic is injected into the mold.

Figure 3:
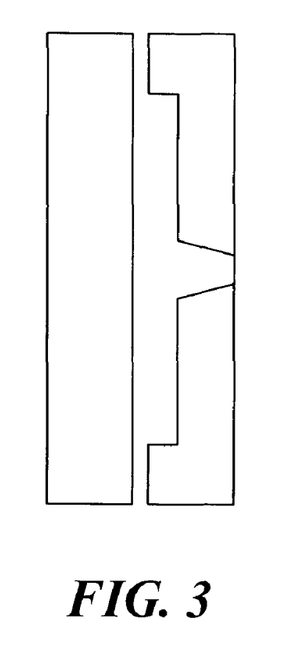
FIG. 3 shows a cross-sectional view of the mold of FIG. 2, with the core block moved into proximity with the cavity block, in accordance with an embodiment of the present invention.
Figures 4, 5:
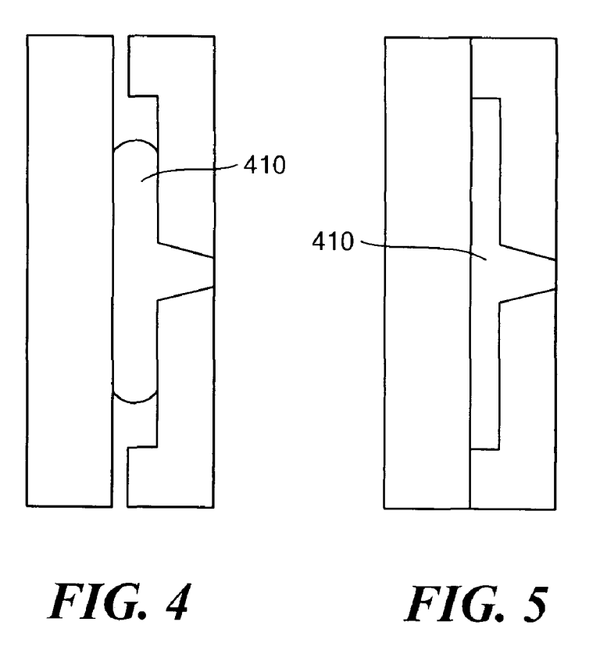
FIG. 4 shows a cross-sectional view of the mold of FIG. 2, with the core block moved into proximity with the cavity block and molten plastic injected into the cavity, in accordance with an embodiment of the present invention.
FIG. 5 shows a cross-sectional view of the mold of FIG. 2, with the core block fully engaged with the cavity block under high compression force in order to allow the molten plastic to fully fill the cavity, in accordance with an embodiment of the present invention.
Figure 6:
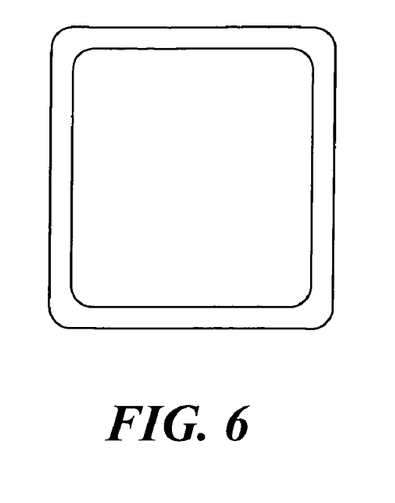
FIG. 6 shows an exemplary lens having a clear window surrounded by a metallic decoration, in accordance with an embodiment of the present invention.

In order to produce the molded product, the core block 210 is moved into proximity with the cavity block 220, but is not fully locked into place, as represented in FIG. 3. With the core block 210 in proximity with the cavity block 220, molten plastic 410 is injected into the mold, as represented in FIG. 4. The core block 210 is then fully engaged with the cavity block 220 under high compression force in order to allow the molten plastic to fully fill the cavity, as represented in FIG. 5. Ventilation holes (not shown) allow air and other gases to escape during injection and compression. A hologram, label, image, graphic, digital code, RFID tag, or other decoration or feature may be in-molded in the molded product, for example, by including an appropriate stamp or other component within the mold. A first de-gating process (i.e., removal of the residual sprue) is typically performed while the molded product is in the mold. After the molded product is ejected from the mold, further processing can be done on the molded product, such as metallization and coatings. The light transmission devices are separated from the molded product, typically using a machining process. FIG. 6 shows an exemplary light transmission device having a clear window surrounded by a metallic decoration, in accordance with an embodiment of the present invention.

Figure 7:
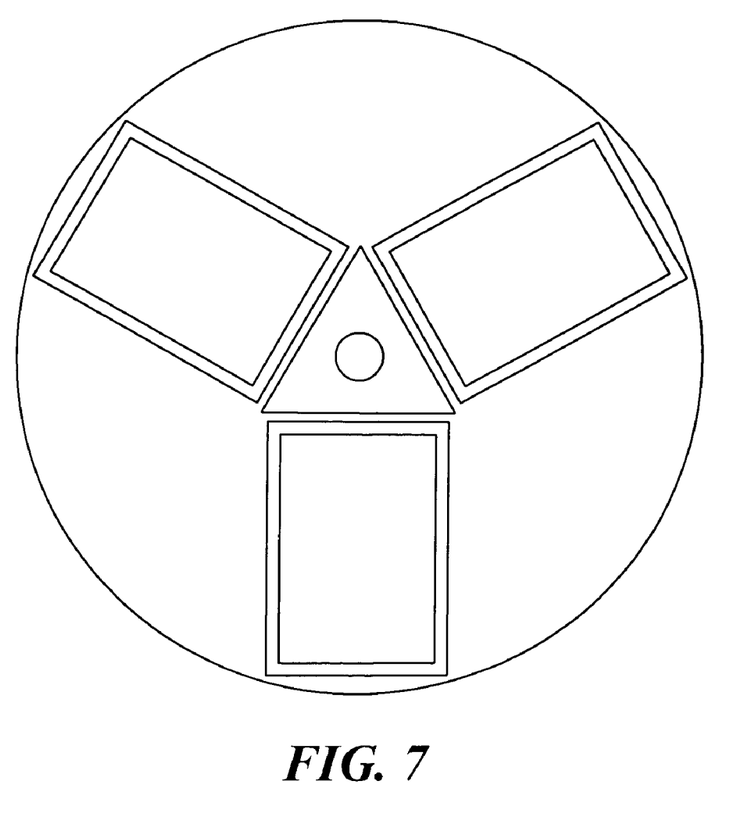
FIG. 7 shows a first alternative embodiment in which there are three lenses in the mold.
Figure 8:
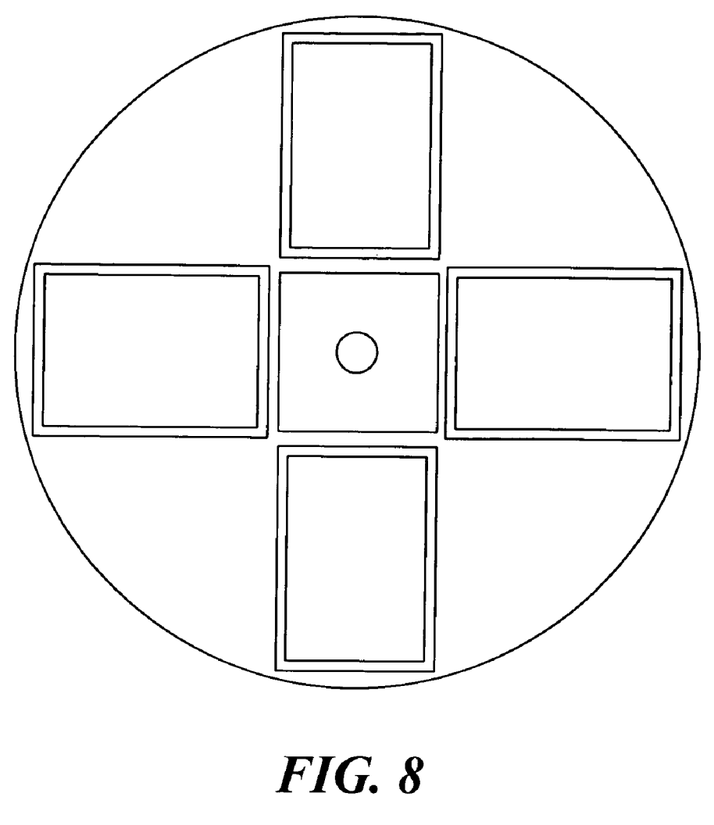
FIG. 8 shows a second alternative embodiment in which there are four lenses in the mold.

While FIG. 1 shows an exemplary embodiment in which two light transmission devices are produced within the outline of a compact disc, it should be noted that the present invention is in no way limited to two light transmission devices per mold or to any particular number of light transmission devices per mold or even to light transmission devices that fit within the outline of a compact disc. FIG. 7 shows a first alternative embodiment in which there are three light transmission devices in the mold. FIG. 8 shows a second alternative embodiment in which there are four light transmission devices in the mold.

Figure 9:
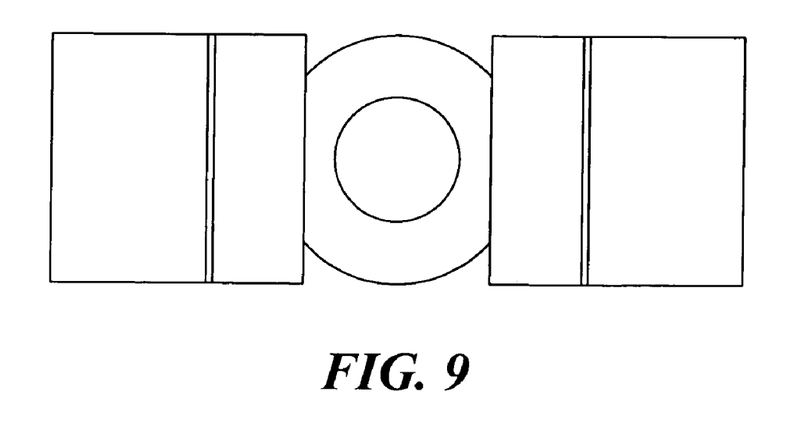
FIG. 9 shows an alternative runner system that facilitates separation of the lenses from the runner during the second de-gating process.

In the embodiment shown in FIG. 1, the light transmission devices are wider than the center bar. In practice, if an attempt is made to separate the light transmission devices from the center bar precisely along the line separating them, it is possible that the resulting edge will not be perfectly straight. One way to alleviate such a problem is to configure the center bar to be as wide as, or wider than, the light transmission devices themselves. An example of this is shown in FIG. 9. In this example, the light transmission devices can be separated from the center bar along the vertical lines.

In a second exemplary embodiment of the present invention, a number of light transmission devices are fabricated from a more conventional disc. Compared with the above-described embodiments, in which the mold includes the outline of the product geometry, the cavity and core blocks in this exemplary embodiment are more conventional and produce a round, flat disc. The disc is run through various processes, which may include metal deposition, deposition of protective and other coatings, and printing. The finished light transmission devices are mechanically separated from the disc, for example, using a CNC (Computerized Numerically Controlled), laser, or punch die machine.

Figure 10:
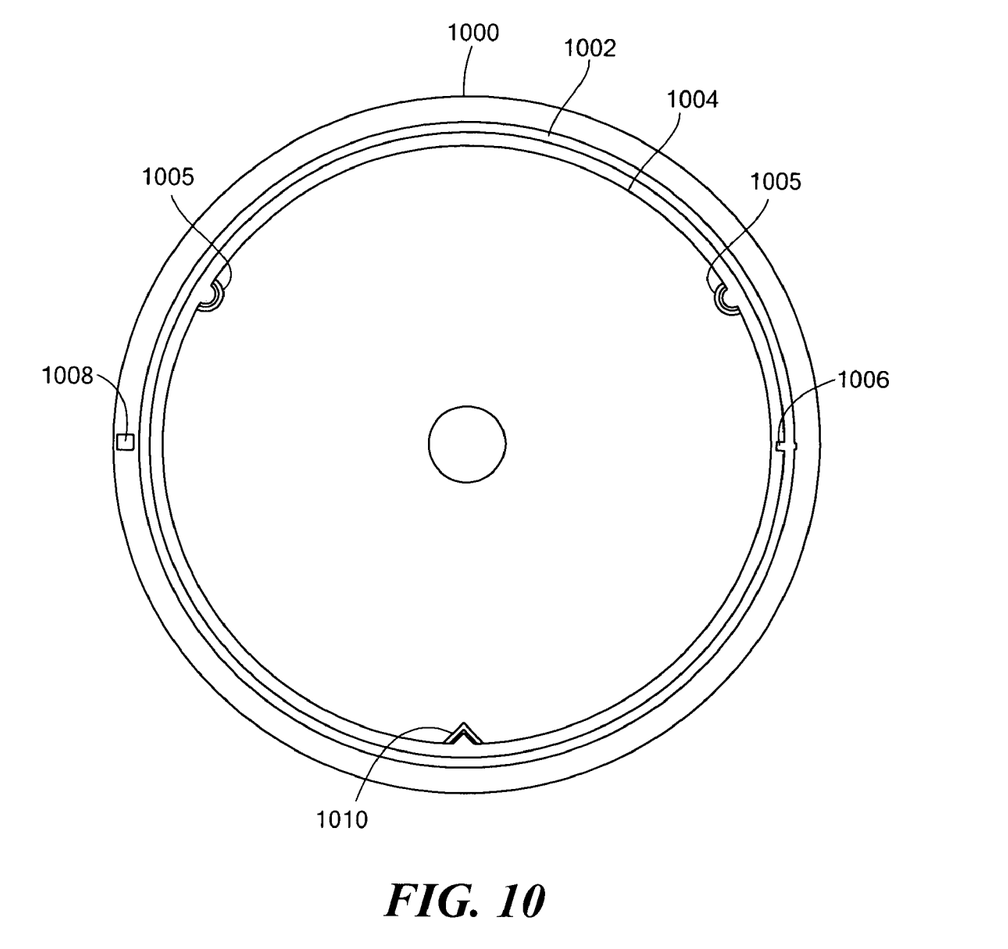
FIG. 10 shows a stamp in accordance with an exemplary embodiment of the present invention.

In related embodiments, a specially configured stamp is used to form generic pit art with various alignment features and optional product-specific pit art on the disc. The generic pit art is used to align the disc during the various finishing processes. FIG. 10 shows a stamp 1000 in accordance with an exemplary embodiment of the present invention. Among other things, the stamp 1000 includes various pit art features, including a ring 1002 with a predefined box 1006, semi-circular references 1005, and caret reference 1010. In this example, there are no product-specific pit art features, although product-specific pit art features (e.g., hologram) could be included within the outline 1004. The stamp with pit art features is placed in a punch machine, which centers the stamp using the pit art ring 1002, locates the box 106, and punches out the center hole, the outside diameter of the stamp, and keyhole 1008. The center line of the keyhole 1008 is aligned with the center line of the pit art box 1006. The semi-circular and caret pit art features are used to align the disc during the various is finishing processes.

In order to mold the disc, the stamp is aligned within the mold, specifically by aligning the keyhole 1008 with a corresponding key post in the mold. The disc is then injection/compression molded, and the center sprue is punched out. The finished disc includes the pit art features transferred from the stamp.

Figure 11:
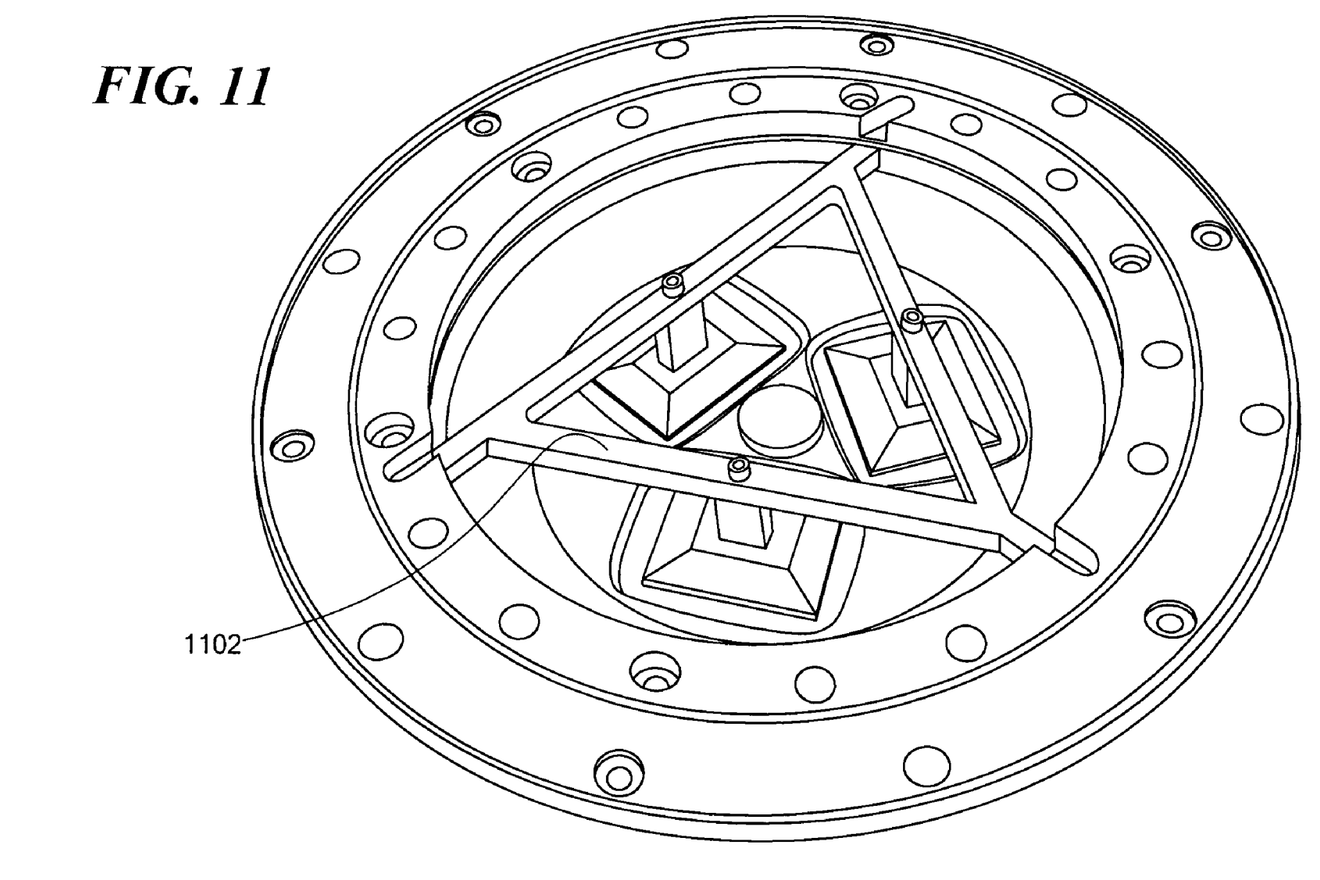
FIG. 11 shows a selective mask in accordance with an exemplary embodiment of the present invention.
Figure 12:
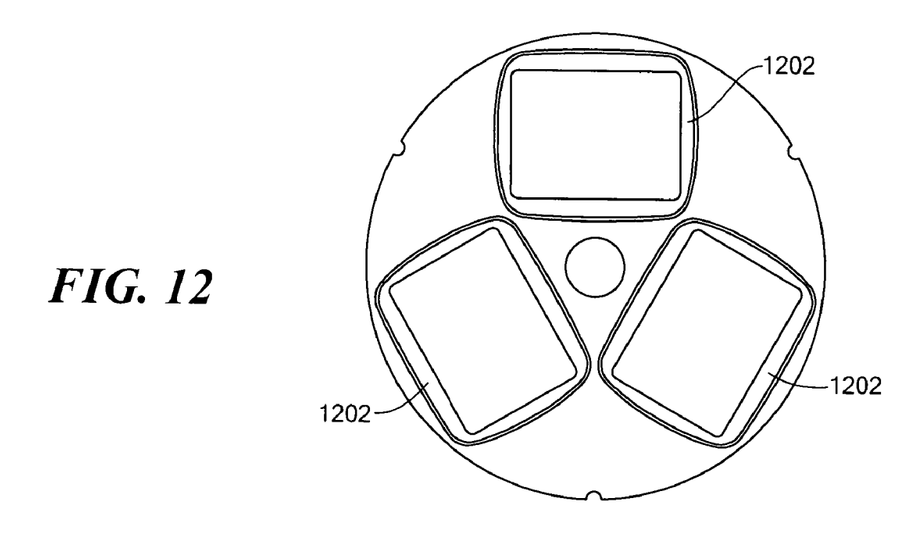
FIG. 12 shows metallized areas surrounding lenses in accordance with an exemplary embodiment of the present invention.

The finished disc is ejected from the molding machine and is moved into an application metal deposition machine including a product-specific selective masking. The selective masking is configured so as to expose only areas of the disc on which metal is to be deposited (e.g., along the edges the lenses). FIG. 11 shows a selective masking 1102 in accordance with an exemplary embodiment of the present invention. In this example, the selective masking exposes the outlines of three light transmission devices. The semi-circular and caret pit art features are used to align the disc within the metal deposition machine, and the selective masking is aligned with the disc. Metal is then deposited, for example, using vacuum deposition/metallization. FIG. 12 shows metallized areas 1202 surrounding the light transmission devices in accordance with an exemplary embodiment of the present invention.

After metal deposition, the disc is moved into a coating machine. Typically, protective coatings are applied to both sides of the disc. Typically, one side of the disc is coated and cured, after which the disc is flipped and the other side of the disc is coated and cured. Other types of coatings (e.g., anti-fingerprint, anti-glare) can also be applied.

After the various coatings have been applied, the disc may be moved into a printing machine for printing optional features on the disc (e.g., using UV ink).

Figure 13:
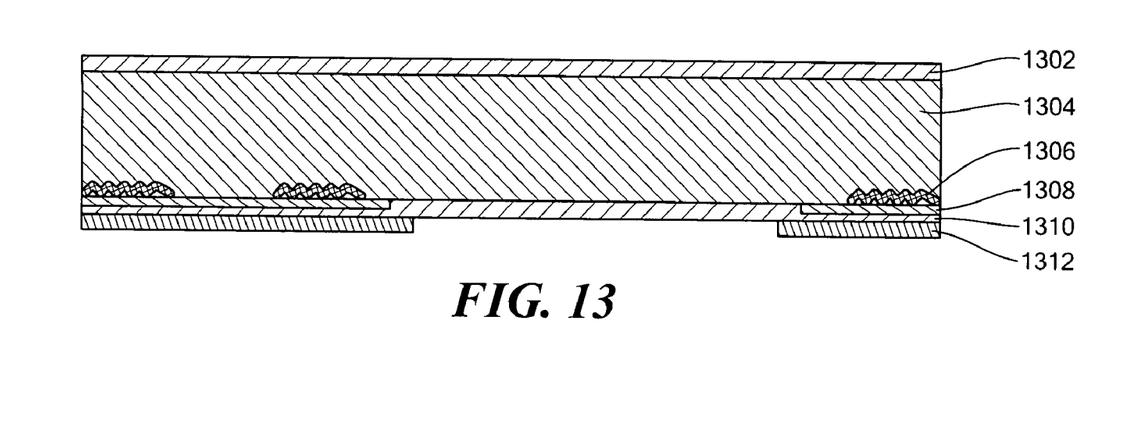
FIG. 13 shows a cross-sectional view of the completed disc in accordance with an exemplary embodiment of the present invention.

FIG. 13 shows a cross-sectional view of the completed disc in accordance with an exemplary embodiment of the present invention. Beginning with the molded disc 1304 including embedded pit art features 1306, a metal layer 1308 is deposited using the selective masking. Protective coatings 1302 and 1310 are then deposited. Finally, a printed layer 1312 is deposited.

Figure 14:
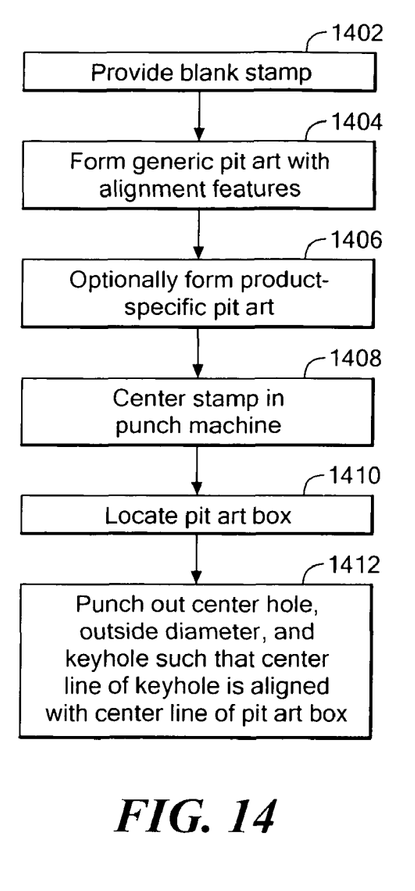
FIG. 14 is a logic flow diagram showing exemplary logic for preparing a stamp in accordance with an exemplary embodiment of the present invention.

FIG. 14 is a logic flow diagram showing exemplary logic for preparing a stamp in accordance with an exemplary embodiment of the present invention. In block 1402, a blank stamp is provided. In block 1404, generic pit art with alignment features is formed on the stamp. In block 1406, product-specific pit art is optionally formed on the disc. In block 1408, the stamp is centered in the punch machine, for example, using the pit art ring as a reference. In block 1410, the pit art box is located. As discussed above, the pit art box is used as a reference for punching out the keyhole. In block 1412, the center hole, outside diameter, and keyhole are punched out such that the center line of the keyhole is aligned with the center line of the pit art box. The stamp can be produced using a conventional laser beam recorded (LBR) that is used to produce stamps for information discs. Typically, the LBR is used to "scribe" pits in a glass master that is used to develop a mold that is used to produce a nickel stamp.

Figure 15:
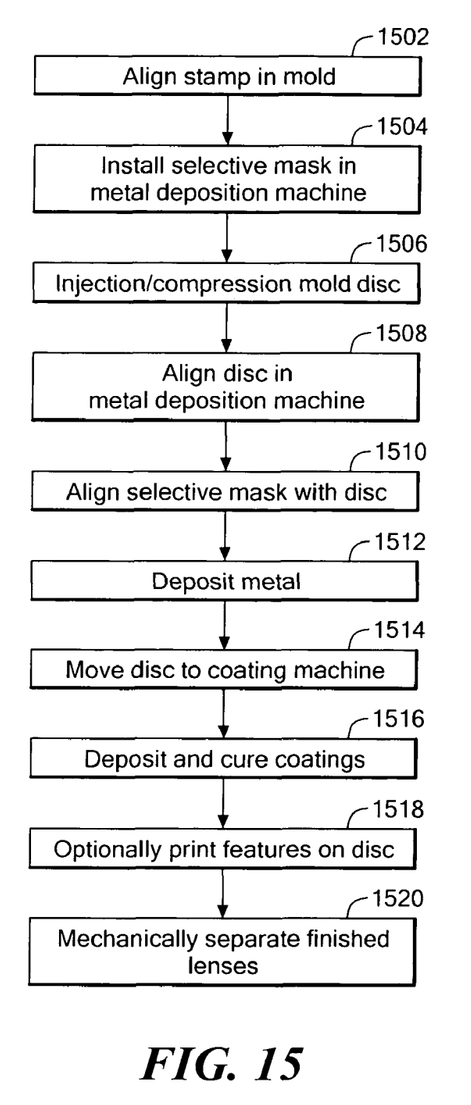
FIG. 15 is a logic flow diagram showing exemplary logic for producing lenses in accordance with an exemplary embodiment of the present invention.

FIG. 15 is a logic flow diagram showing exemplary logic for producing light transmission devices in accordance with an exemplary embodiment of the present invention. In block 1502, the stamp is aligned in the mold, specifically by aligning the keyhole in the stamp with a corresponding key post in the mold. In block 1504, the selective masking is installed in the metal deposition machine. In block 1506, the disc is injection/compression molded. In block 1508, after the disc is ejected from the molding machine, the disc is aligned in the metal deposition machine, specifically using the semi-circular and caret pit art features as references. In block 1510, the selective masking is aligned with the disc. In block 1512, metal is deposited. In block 1514, the disc is moved to the coating machine. In block 1516, various coatings are deposited and cured. In block 1518, various features are optionally printed on the disc. In block 1520, the finished lenses are mechanically separated from the disc.

Figure 16:
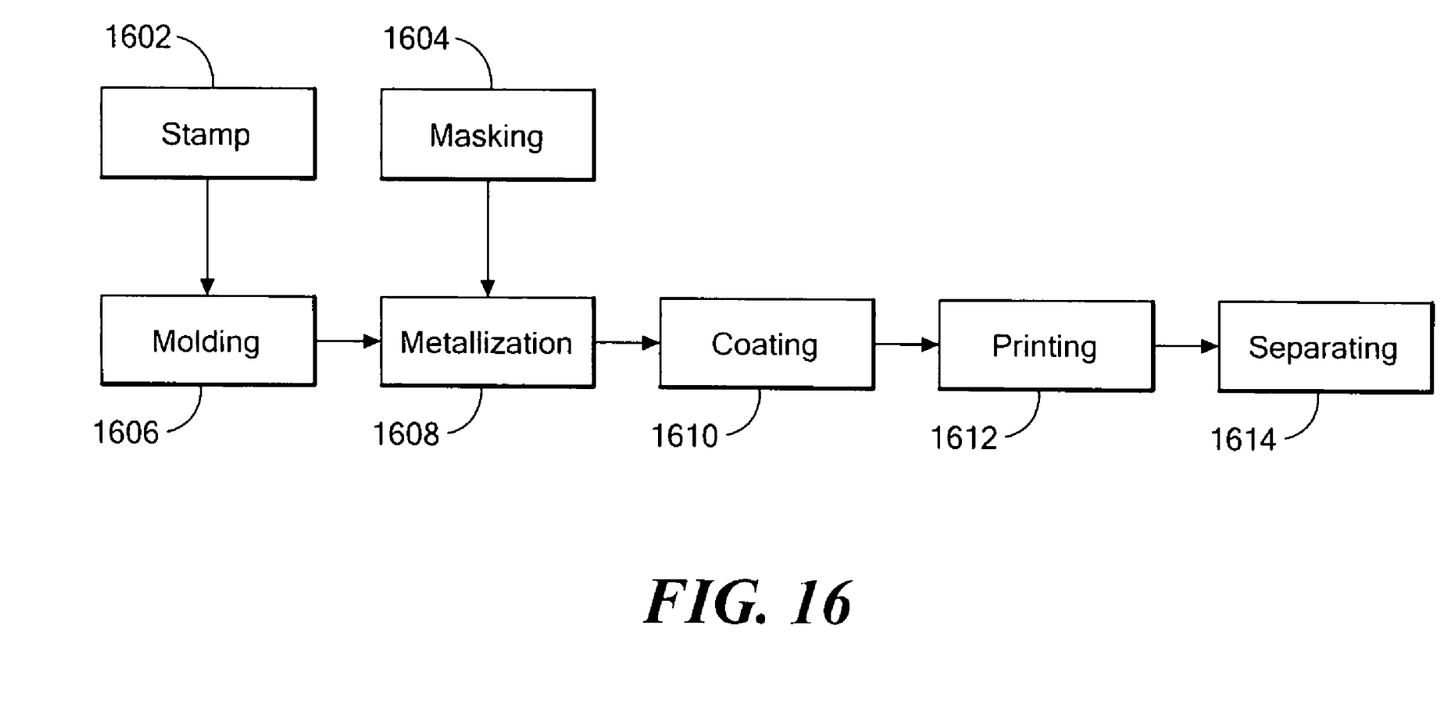
FIG. 16 is a block diagram showing the relevant components of a light transmission device molding system in accordance with an exemplary embodiment of the present invention.

FIG. 16 is a block diagram showing the relevant components of a light transmission device molding system in accordance with an exemplary embodiment of the present invention. Among other things, the system includes molding machine 1606, metallization machine 1608, coating machine 1610, printing machine 1612, and separating machine 1614. Stamp equipment 1602 may be included to produce a stamp for use in the molding machine 1606. Masking equipment 1604 may be included to produce a selective mask for use in the metallization machine 1608. As discussed above, the molded product with optional pit art features and/or in-molded decorations or features is produced by the molding machine 1606 using an injection-compression molding technique. The molded product is moved into the metallization machine 1608, which selectively deposits metal onto the molded product using the selective masking. The molded product is then moved into the coating machine 1610, which deposits various coatings onto the molded product. The molded product is then moved into the printing machine 1612, which prints various features onto the molded product. The molded product is then moved into the separating machine 1614, which mechanically separates the light transmission devices from the molded product. As discussed above, some of these machines/processes may be optional, and additional machines/processes may be employed. For example, in an exemplary embodiment of the invention, a racking machine is used to receive the molded product from the molding machine 1606 and move the molded product into the metallization machine 1608 in a coordinated manner. It should be noted that machines described with reference to FIG. 16 may be separate machines or may be modules or components of a larger machine.

It should be noted that various processes discussed above, such as stamping, metallization, coating, printing, and formation of various optical and mechanical references, can be employed generally. Thus, for example, embodiments described above with references to FIGS. 1-9 may be modified to include stamping, metallization, coating, and printing substantially as described with reference to FIGS. 10-15.

It should also be noted that the present invention is not limited to or by the various processes discussed above. For example, the present invention is not limited to or by the various metal deposition, coating, and printing processes discussed above. Additional and/or different processes can be employed to produce light transmission devices with various features.

The above-described processes for molding light transmission devices using modified information disc molding equipment and processes can have certain advantages over straight injection molding of lenses. One possible advantage is that light transmission devices can be produced much more quickly (on the order of a few seconds) compared to many seconds for straight injection molded devices. Another advantage is that the light transmission devices can have reduced birefringence compared to straight injection molded devices, specifically because the injection-compression molding typically produces less stress and more even molecular orientation than straight injection molding.

While the embodiments described above are typically used to produce flat devices, it will be clear to the skilled artisan that curved and other non-flat devices can be produced in a similar fashion by appropriate modification or configuration of the cavity and/or core blocks.

The present invention may be embodied in other specific forms without departing from the true scope of the invention. The described embodiments are to be considered in all respects only as illustrative and not restrictive.

What is claimed is:

1. A method for producing a light transmission device, the method comprising:

injecting molten plastic by a molding machine into a light transmission device mold, the light transmission device mold having an integral runner in substantially the same plane and with substantially the same wall thickness as the light transmission device, the light transmission device mold further having a stamp including an arrangement of pit art features for producing stamped pit art features including at least one optical alignment reference in a molded product;

compressing the mold by the molding machine to form the molded product through an injection/compression molding process, the molded product including at least one light transmission device, the stamped pit art features including at least one external optical reference so as to be excluded from the finished light transmission device; and processing the molded product by a number of finishing process machines performing finishing processes for the light transmission device on the molded product, at least one of the finishing process machines using the at least one optical alignment reference for optically orienting the molded product for a finishing process.

2. A method according to claim 1, wherein the mold includes an outline of the light transmission device geometry such that the molded product includes a substantially shaped light transmission device.

3. A method according to claim 1, wherein the mold is substantially devoid of light transmission device features such that the molded product is a blank from which the light transmission device is cut.

4. A method according to claim 1, wherein the pit art features include at least one of a ring, a box, a semi-circle, and a caret.

5. A method according to claim 1, wherein the pit art features include decorative product-specific pit art features on the light transmission device.

6. A method according to claim 1, wherein the pit art features include pit art for forming a hologram on the light transmission device.

7. A method according to claim 1, further comprising:
in-molding at least one of a hologram, a label, an image, a graphic, a digital code, and an RFID tag in the molded product.

8. A method according to claim 1, further comprising:
after forming the molded product, removing a residual sprue from the molded product within the mold.

9. A method according to claim 8, wherein removing the residual sprue from the molded product within the mold comprises:
forming a mechanical reference for orienting the molded part during one or more finishing processes.

10. A method according to claim 1, wherein the finishing processes include a metal deposition process further comprising:
aligning the molded product in a metal deposition machine using the at least one optical alignment reference in the molded product;
aligning a selective masking to the molded product, the selective masking exposing areas of the molded product on which metal is to be deposited; and
depositing metal on the exposed areas of the molded product.

11. A method according to claim 1, wherein the finishing processes include a mechanical separation process further comprising:
aligning the molded product in a mechanical separation machine using the at least one optical alignment reference in the molded product; and
mechanically separating the light transmission device from the molded product.

12. A method according to claim 1, wherein the finishing processes include a coating process further comprising:
aligning the molded product in a coating machine using the at least one optical alignment reference in the molded product; and
depositing at least one coating on the molded product.

13. A method according to claim 10, wherein the finishing processes include a coating process further comprising:
aligning the molded product in a coating machine; and
depositing at least one coating on the molded product.

14. A method according to any of claim 12 or 13, wherein depositing the at least one coating comprises:
depositing a first coating on a first side of the molded product;
curing said first coating;
flipping the molded product;
depositing a second coating on a second side of the molded product; and
curing said second coating.

15. A method according to any of claim 12 or 13, wherein the at least one coating comprises at least one of:
a protective coating;
an anti-fingerprint coating; and
an anti-glare coating.

16. A method according to claim 1, wherein the finishing processes include a printing process further comprising:
aligning the molded product in a printing machine using the at least one optical alignment reference in the molded product; and
printing at least one feature on the molded product.

17. A method according to claim 13, wherein the finishing processes include a printing process further comprising:
aligning the molded product in a printing machine; and
printing at least one feature on the molded product.

18. A method according to any of claim 16 or 17, wherein the molded product is aligned in the printing machine using at least one of a mechanical reference and an optical alignment reference formed in the molded product.

19. A method according to any of claim 16 or 17, wherein the at least one feature is printed on the molded product using UV ink.

20. A method according to claim 1, wherein the molding machine is a substantially conventional injection/compression molding machine used to produce information discs.

21. A method according to claim 1, wherein the stamp is formed using a substantially conventional laser beam recorder used to produce stamps for information discs.

* * * * *